United States Patent
Chang et al.

(10) Patent No.: US 11,080,558 B2
(45) Date of Patent: Aug. 3, 2021

(54) SYSTEM AND METHOD OF INCREMENTAL LEARNING FOR OBJECT DETECTION

(71) Applicant: INTERNATIONAL BUSINESS MACHINES CORPORATION, Armonk, NY (US)

(72) Inventors: Shiyu Chang, Elmsford, NY (US); Emrah Akin Sisbot, Pleasantville, NY (US); Norma Edith Sosa, Ossining, NY (US); Wang Zhou, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 16/360,563

(22) Filed: Mar. 21, 2019

(65) Prior Publication Data
US 2020/0302230 A1 Sep. 24, 2020

(51) Int. Cl.
*G06K 9/62* (2006.01)
*G06N 3/08* (2006.01)
*G06K 9/32* (2006.01)

(52) U.S. Cl.
CPC ......... *G06K 9/6256* (2013.01); *G06K 9/3241* (2013.01); *G06N 3/08* (2013.01)

(58) Field of Classification Search
None
See application file for complete search history.

(56) References Cited

U.S. PATENT DOCUMENTS 8,457,391 B2  6/2013 Ai et al.
9,477,908 B2  10/2016 Sigal et al.
(Continued)

FOREIGN PATENT DOCUMENTS

CN  107256423 A  10/2017
CN  108416378 A  8/2018
(Continued)

OTHER PUBLICATIONS

Anonymous, "Cascade deep learning model training for visual analytics," ip.com, Prior Art Database Technical Disclosure, No. IPCOM000245969D, Apr. 21, 2016.
(Continued)

*Primary Examiner* — Leon Flores
(74) *Attorney, Agent, or Firm* — Samuel A. Waldbaum

(57) ABSTRACT

Methods and systems perform incremental learning object detection in images and/or videos without catastrophic forgetting of previously-learned object classes. A two-stage neural network object detector is trained to locate and identify objects pertaining to an additional object class by iteratively updating the two-stage neural network object detector until an overall detection accuracy criterion is met. The updating is performed so as to balance minimizing a loss of an initial ability to locate and identify objects pertaining to the previously-learned object classes and maximizing an ability to additionally locate and identify the objects pertaining to the additional object class. Assessing whether the overall detection accuracy criterion is met compares outputs of an initial version of the two-stage neural network object detector with a current region proposal output by a current version of the two-stage neural network object detector to determining a region proposal distillation loss and a previously-learned-object identification distillation loss.

24 Claims, 10 Drawing Sheets

(56) References Cited

U.S. PATENT DOCUMENTS

| | | | |
|---|---|---|---|
| 9,805,264 | B2 | 10/2017 | Kuznetsova et al. |
| 9,881,234 | B2 | 1/2018 | Huang |
| 9,916,538 | B2 | 3/2018 | Zadeh et al. |
| 2015/0213325 | A1 | 7/2015 | Krishnamoorthi et al. |
| 2020/0175384 | A1* | 6/2020 | Zhang .................. G06N 3/0454 |

FOREIGN PATENT DOCUMENTS

| | | |
|---|---|---|
| CN | 109145939 A | 1/2019 |
| CN | 109271970 A | 1/2019 |

OTHER PUBLICATIONS

Anonymous, "Incrementally Learning Sample-Specific Ensemble of Segmentation Techniques in Medical Imaging," ip.com, Prior Art Database Technical Disclosure, No. IPCOM000244845D, Jan. 21, 2016.

Chen et al., "An Implementation of Faster RCNN with Study for Region Sampling," arXiv:1702.02138, Feb. 8, 2017.

Chen et al., "Learning Efficient Object Detection Models with Knowledge Distillation," 31st Conference on Neural Information Processing Systems (NIPS 2017), Dec. 4-9, 2017, Long Beach, CA, USA.

Chen et al., "NEIL: Extracting Visual Knowledge from Web Data," 2013 IEEE International Conference on Computer Vision, Dec. 1-8, 2013, Sydney, NSW, AU.

Chen et al., "Webly Supervised Learning of Convolutional Networks," Proceedings of the 2015 IEEE International Conference on Computer Vision (ICCV), Dec. 7-13, 2015, Santiago, CL.

"COCO—Common Objects in Context," retrieved from Internet Mar. 18, 2019, http://cocodataset.org.

Girshick, "Fast R-CNN," 2015 IEEE International Conference on Computer Vision (ICCV), Dec. 7-13, 2015, Santiago, CL.

He et al., "Deep Residual Learning for Image Recognition," 2016 IEEE Conference on Computer Vision and Pattern Recognition (CVPR), Jun. 27-30, 2016, Las Vegas, NV, USA.

Hinton et al., "Distilling the Knowledge in a Neural Network," arXiv:1503.02531, Mar. 9, 2015.

Kirkpatrick et al., "Overcoming catastrophic forgetting in neural networks," Proceedings of the National Academy of Sciences (PNAS), Mar. 28, 2017, vol. 114, No. 13.

PASCAL 2, "The PASCAL Visual Object Classes Homepage," retrieved from Internet Mar. 18, 2019, http://host.robots.ox.ac.uk/pascal/VOC/.

Ren et al., "Faster R-CNN: Towards Real-Time Object Detection with Region Proposal Networks," Advances in neural information processing systems, 2015.

Shmelkov et al., "Incremental Learning of Object Detectors without Catastrophic Forgetting," 2017 IEEE International Conference on Computer Vision (ICCV), Oct. 22-29, Venice, IT.

Jijlings et al., "Selective Search for Object Recognition," International Journal of Computer Vision, Sep. 2013, vol. 104, No. 2.

Zitnick et al., "Edge Boxes: Locating Object Proposals from Edges," European Conference on Computer Vision, Sep. 2014.

International Searching Authority, "Notification of Transmittal of the International Search Report and the Written Opinion of the International Searching Authority, or the Declaration," Patent Cooperation Treaty, Jul. 10, 2020, 9 pages, International Application No. PCT/1132020/052301.

\* cited by examiner

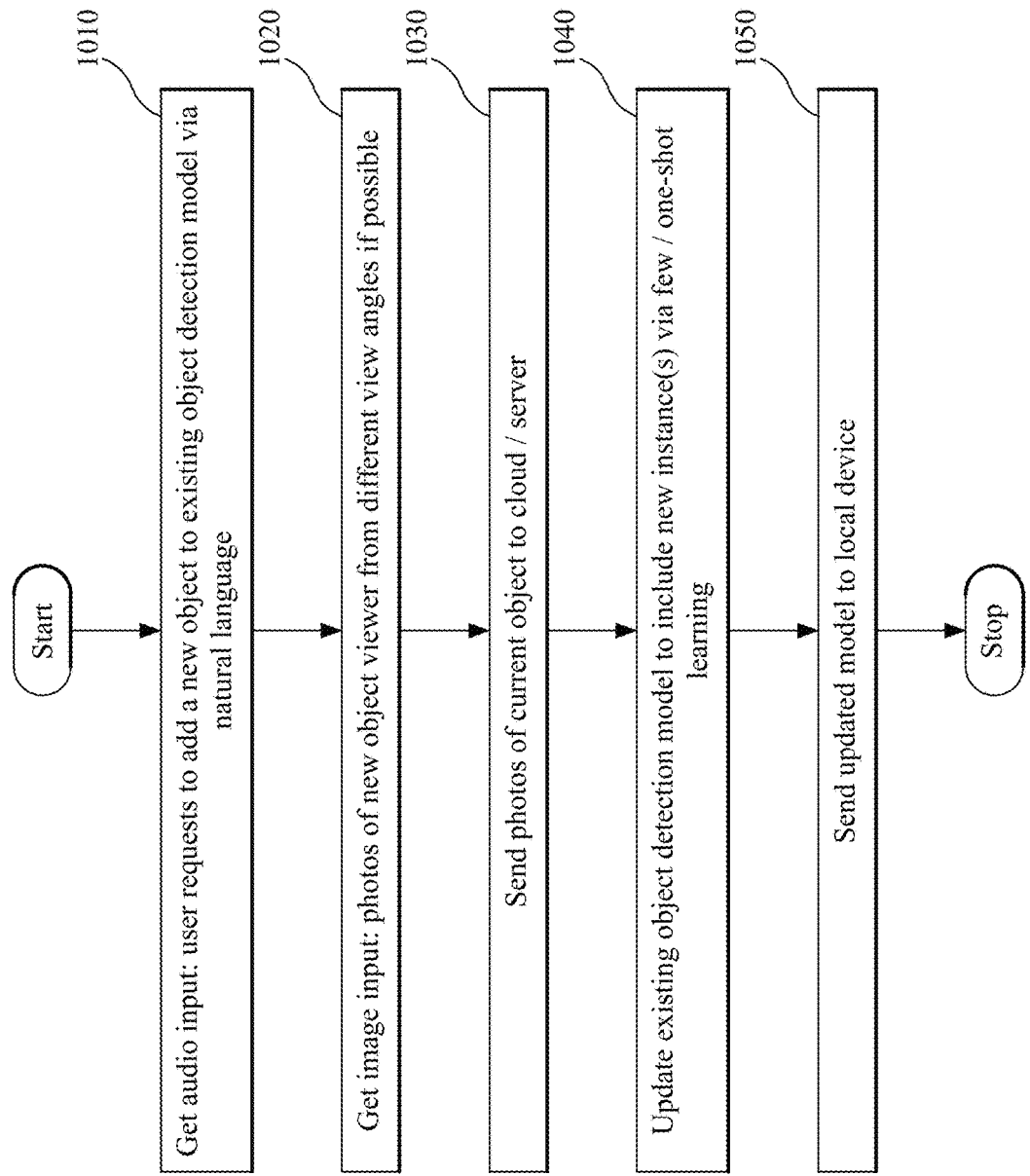

SYSTEM AND METHOD OF INCREMENTAL LEARNING FOR OBJECT DETECTION

FIELD OF THE INVENTION

The present invention relates to detecting objects in images and/or videos.

BACKGROUND OF THE INVENTION

Various real-life applications such as automatic analysis of medical images and image-recognition-based security detect objects (i.e., instances of known object classes) in images and/or videos. Recently, object detection in images and/or videos benefited significantly from developments in neural networks. As used herein, the term "object detector(s)" is a shorter form of "neural network object detector(s)." A neural network object detector is essentially a model characterized by a set of parameters. Object detection includes determining the location and the type or class of objects in images and/or videos. Conventional object detectors utilize one-stage or two-stage object detectors. One-stage object detectors, for example, You-Only-Look-Once, YOLO, and Single-Shot-Detection, SSD), determine simultaneously where and what objects are present by making a fixed number of grid-based object predictions. Two-stage object detectors separately propose regions where known objects are likely located and then associate specific object predictions (e.g., probabilities) to the proposed regions.

However, neural networks suffer from catastrophic forgetting, i.e., losing an ability to detect a first class of objects when incremental learning is used to retrain a given object detector to detect a second class of objects, which renders incremental learning incompatible with lifelong detection. Attempts to bypass catastrophic forgetting include running a new object detector dedicated to the new classes in parallel with the object detector for detecting the previously-learned classes, which doubles the necessary computational resources (memory and execution capacity). Another approach trains the object detector with images including a combination of objects pertaining to both the new and the previously-learned classes but such combined data sets may not be available. Training the object detector with a large dataset including both new classes object images and previously-learned classes object images also dramatically increases the necessary computational resources.

A fast region convolutional neural network (RCNN) architecture that uses precomputed object proposals and therefore runs slow was proposed by K. Shmelkov in "Incremental Learning of Object Detectors without Catastrophic Forgetting", International Conference on Computer Vision (2017). This article discusses using knowledge distillation to add new classes to region classifiers, but this is problematic as the foregoing method cannot be directly applied to more advance architectures like faster-RCNN.

Neural-network-based object detection models are conventionally trained on object detection datasets such as PASCAL VOC and COCO which have 20 and 80 categories, respectively. The object classes that can be detected are determined by the dataset used to train the model. Once the model has been trained, the object classes cannot be altered without retraining the entire network with labeled data for all the classes of interest.

If training data (images) for an existing model are not available to a user (e.g., respective websites are slow or unavailable) or the user lacks privilege to access the original data, the user cannot update the model by adding new object classes that have become relevant to the user.

Therefore, neural network object detectors (i.e., methods and devices) able to avoid catastrophic forgetting of previously-learned object classes when trained to detect objects pertaining to new object classes are desired. A more advanced object detection system that can be customized ad-hoc if the user wants to add new object classes and that can update object detection models upon request is needed.

SUMMARY OF THE INVENTION

Exemplary embodiments are directed to methods for incrementally learning new object classes (i.e., training an object detector to detect objects pertaining to the new classes) without catastrophic forgetting to detect objects pertaining to previously-learned classes. The object detector is updated using a total loss that enables balancing an ability to detect new class objects with an ability to detect previously-learned classes objects without requiring access to the images previously used to train the object detector. The trained and updated object detector retains the ability to detect objects pertaining to previously-learned object classes, while extending its detection ability to objects pertaining to the new object classes.

Other exemplary embodiments are directed systems that detect known object classes, interact with an user (e.g., via natural language), receive requests from the user to add new object classes, gather necessary training data autonomously, and retrain the object detector to locate and identify objects pertaining to new classes without dramatically losing the ability to detect objects pertaining to previously-learned object classes. In one embodiment, the system provides new object class recommendations and requests to the user.

Exemplary embodiments are directed to methods for incremental learning object detection in images without catastrophic forgetting of previously-learned object classes. The methods include training an existing two-stage neural network object detector to locate and identify objects pertaining to at least one additional object class in images by iteratively updating the two-stage neural network object detector until an overall detection accuracy criterion is met. The updating is performed so as to balance minimizing a loss of an initial ability to locate and identify objects pertaining to the previously-learned one or more object classes and maximizing an ability to locate and identify the objects pertaining to the additional object class.

Another exemplary embodiment is directed to methods for incremental learning object detection without catastrophic forgetting of previously-learned object classes that includes receiving training images including objects pertaining to an object class unknown to an initial version of a two-stage neural network object detector that is able to detect objects pertaining to at least one previously-learned object class. The method further includes training the two-stage neural network object detector to detect the objects of the object class initially unknown, using one-by-one plural images among the training images, until a predetermined condition is met. The training includes (1) inputting one image of the plural images to the initial version of the two-stage neural network object detector to obtain a first region proposal and a first object prediction for the at least one previously-learned object class, (2) inputting the one image to a current version of the two-stage neural network object detector to obtain a second region proposal and a second object prediction for the at least one previously-learned object class and the object class initially unknown, (3) comparing the first region proposal with the second region proposal to estimate a region proposal distillation loss quantifying a decrease of ability to locate objects of the at least one previously-learned object class, (4) comparing the first object prediction with the second object prediction to estimate an object identification distillation loss quantifying a decrease of ability to identify the objects of the at least one previously-learned object class, (5) comparing the second region proposal with ground-truth labels of the one image to estimate a region proposal network loss for the object class initially unknown, (6) comparing the second object prediction with the ground-truth labels to estimate an object identification loss for the object class initially unknown, (7) calculating a total loss combining the region proposal distillation loss, the object identification distillation loss, the region proposal network loss and the object identification loss, and (8) updating the current version of the two-stage neural network object detector so as to minimize the total loss. The predetermined condition is met when the number of training iterations reaches a predetermined number, or when a total loss decrease rate is below a predetermined threshold.

Exemplary embodiments are directed to computer-readable media containing a computer-readable code that when read by a computer causes the computer to perform methods for incremental learning for object detection in images without catastrophic forgetting of previously-learned one or more object classes. The methods include training a two-stage neural network object detector to locate and identify objects pertaining to an additional object class by iteratively updating the two-stage neural network object detector until an overall detection accuracy criterion is met. Updating is performed to balance minimizing a loss of an initial ability to locate and identify objects pertaining to the previously-learned one or more object classes and maximizing an ability to locate and identify the objects pertaining to the additional object class.

Other exemplary embodiments are directed to systems for incremental learning for object detection without catastrophic forgetting of previously-learned object classes. The systems each include a computing device configured to receive images, to use a two-stage neural network object detector to locate and identify objects, and to communicate with a cloud server, and the cloud server. This cloud server is configured to gather training images, to store an initial version of the two-stage neural network object detector that locates and identifies one or more object classes, and to communicate with the computing device and Internet. At least one of the computing device and the cloud server is configured to train the two-stage neural network object detector to locate and identify objects pertaining to an additional object class by iteratively updating the two-stage neural network object detector, which is initially able to locate and identify objects pertaining to one or more object classes until an overall detection accuracy criterion is met, the updating being performed so as to balance minimizing a loss of an initial ability of the two-stage neural network detector to locate and identify objects pertaining to the one or more object classes and maximizing an ability of the two-stage neural network detector to locate and to identify objects pertaining to the additional object class.

BRIEF DESCRIPTION OF THE DRAWINGS

FIG. 10 is a flowchart illustrating adding new object classes to an object detection model upon receiving a user request according to an embodiment.

DETAILED DESCRIPTION

Flowcharts and block diagrams in figures used in the following descriptions illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary embodiments described hereinafter are directed to incremental learning to detect objects pertaining to new classes without catastrophic forgetting to detect objects pertaining to previously-learned object classes. Training an object detector aims: (A) to make the detector able to detect (i.e., locate and identify) objects pertaining to new classes regardless where such objects are located and what other objects occur in an image; (B) to maintain a good performance for detecting objects pertaining to the previously-learned classes; (C) to employ a reasonable number of model parameters and to have acceptable memory requirements for using the model; and (D) to provide an end-to-end learning mechanism that jointly updates the classifier to identify the new object class and the feature representation to locate an object pertaining to the new object class.

Figure 1:
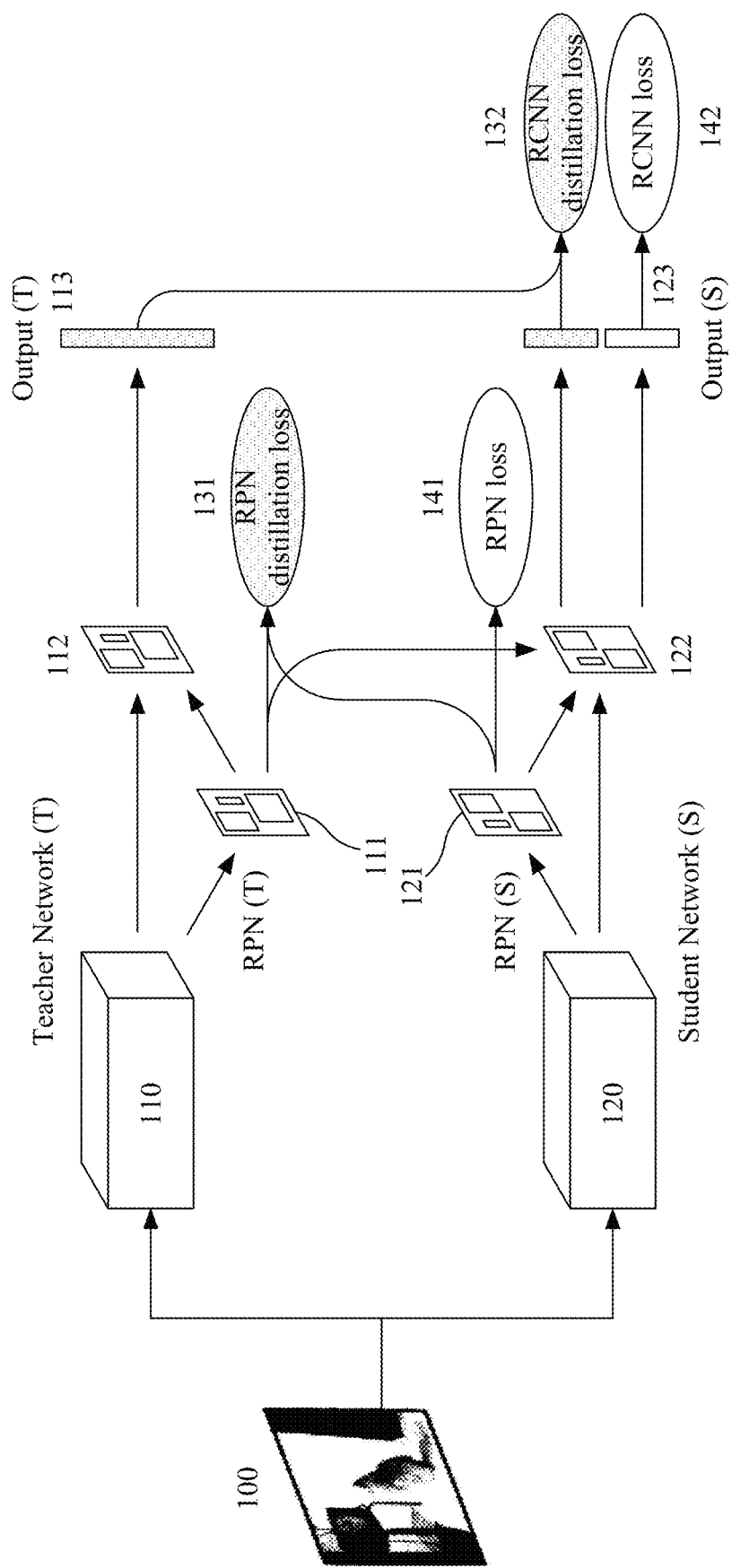
FIG. 1 is a schematic illustration of incremental learning object detection without catastrophic forgetting according to an embodiment.

FIG. 1 schematically represents incremental learning object detection in images without catastrophic forgetting of previously-learned object classes according to an embodiment. An initial version of a two-stage object detector, which is named "Teacher Network (T)," is able to detect (i.e., locate and identify) objects pertaining to the previously-learned object classes. A current version of the two-stage neural network object detector named "Student Network (S)" is trained to detect objects pertaining to a new object class. The following description refers to a single new object class, but plural object classes may be added successively or simultaneously. The student network starts with the parameters from the teacher network, but output from the student network is extended to detect objects pertaining to the new object class.

Training images 100 include objects pertaining to the new object class but may also include objects pertaining to previously-learned object classes. These training images are input one-by-one or batch-after-batch to the teacher network 110 and to the student network 120 (i.e., parallel to both networks and in series through the training images). For each input image, the teacher network 110 yields a teacher region proposal (RPN(T)) 111 used to extract a feature vector 112 and a teacher object prediction 113 identifying one of the previously-learned object classes as corresponding to an object in each region of the teacher RPN. Also, for each input image, the student network 120 yields a student region proposal (RPN(S)) 121 used to extract a feature vector 122 and a student object prediction 123 identifying one of the previously-learned object classes or the new object class as corresponding to an object in each region of RPN(S).

Detection accuracy may be estimated based on the teacher network's and student network's outputs. A region proposal network distillation loss 131 quantifying a decrease of student network's ability to locate objects of the previously-learned object classes is based on comparing the teacher region proposal 111 with the student region proposal 121. An object identification distillation loss 132 quantifying a decrease of student network's ability to identify the objects of the previously-learned object classes is based on comparing the teacher object prediction 112 with the student object prediction 122.

Further, comparing the student network's outputs with ground-truth labels associated with the training image enables estimating student network's region proposal loss 141 related to locating objects pertaining to the new object class and student network's object identification loss 142 related to identifying objects pertaining the new object class. In machine learning, the term "ground truth" refers to the training set's classification label or simpler said to the objects in the training images real location and identity.

In one embodiment, a total loss is defined by combining the region proposal network distillation loss, the object identification distillation loss, the region proposal network loss and the object identification loss. The student network may then be updated so as to minimize the total loss. The combination may be a simple summation of relative measures of these losses, or a weighted summation thereof. In mathematical form:

$$L_{total} = \lambda_1 L_{new}^{RPN} + \lambda_2 L_{new}^{RCNN} + \lambda_3 L_{dist}^{RPN} + \lambda_4 L_{dist}^{RCNN} \quad (1)$$

where $L_{total}$ is total loss, $L_{dist}^{RPN}$ is the region proposal network distillation loss, $L_{dist}^{RCNN}$ is the object identification distillation loss, $L_{new}^{RPN}$ is the region proposal network loss and $L_{new}^{RCNN}$ is the object identification loss, and $\lambda_1 \ldots \lambda_4$ are the corresponding weights.

The use of the total loss in updating the object detector is a way to balance minimizing its loss of ability to detect objects pertaining to previously-learned objects and maximizing its ability to detect objects pertaining to the newly-added object class. However, there are other ways to achieve this balance; for example, there may be a predefined limit to a loss of ability to detect objects pertaining to any individual previously-learned object classes, to an average loss of ability and/or to the ability to detect objects pertaining to the added object class (in this case the predefined limit is a threshold that must be exceeded), etc.

Figure 2:
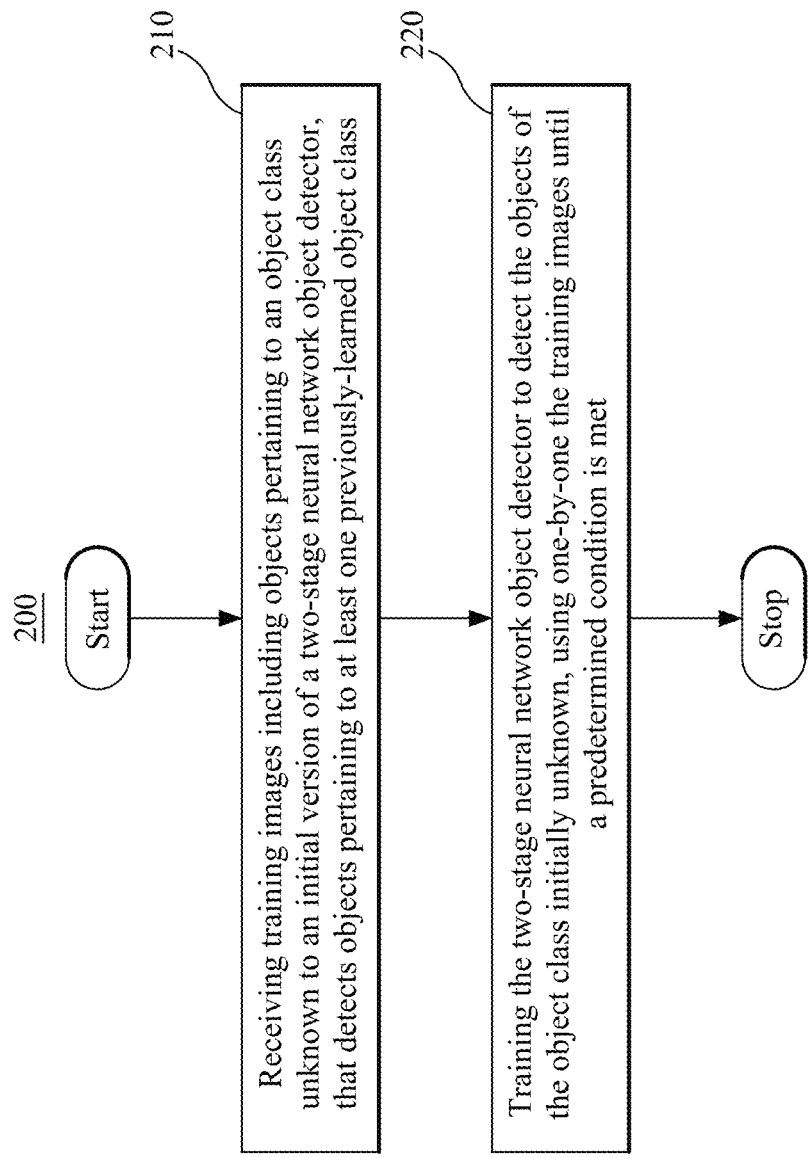
FIG. 2 is a flowchart of a method for incremental learning object detection in images without catastrophic forgetting of previously-learned one or more object classes according to an embodiment.

FIG. 2 is a flowchart of a method 200 for incremental learning object detection without catastrophic forgetting according to an embodiment. Training images including objects pertaining to an object class unknown to an initial version of a two-stage neural network object detector that is able to detect objects pertaining to at least one previously-learned object class are received 210. Training images have associated ground-truth labels indicating locations (e.g. regions which may be boxes) and object classes of the objects therein, respectively.

The two-stage neural network object detector is trained to detect the objects of the object class initially unknown, using the training images one-by-one or batch-by-batch until a predetermined condition is met at 220. The predetermined condition may be completing a predetermined number of iterations, achieving a threshold accuracy or failing to further decrease losses. Training of the two-stage neural network object detector includes performing the following operations for each image among the plural images:

(1) inputting the image to the initial version of the two-stage neural network object detector (e.g., the teacher network) to obtain a first region proposal and a first object prediction of the previously-learned object classes, (2) inputting the image to a current version of the two-stage neural network object detector (e.g., the student network) to obtain a second region proposal and a second object prediction of the previously-learned object classes and the new object class, (3) comparing the first region proposal with the second region proposal to estimate a region proposal distillation loss quantifying a decrease of ability to locate objects pertaining to the previously-learned object classes, (4) comparing the first object prediction with the second object prediction to estimate an object identification distillation loss quantifying a decrease of ability to identify the objects of the previously-learned object classes, (5) comparing the second region proposal with ground-truth labels of the image to estimate a region proposal network loss for the new object class, (6) comparing the second object prediction with the ground-truth labels to estimate an object identification loss for the new object class, (7) calculating a total loss by combining the region proposal distillation loss, the object identification distillation loss, the region proposal network loss and the object identification loss, and (8) updating the current version of the two-stage neural network object detector so as to minimize the total loss. The updating may adjust the neural network's parameters using any of various known methods (e.g., by applying a stochastic gradient descent method to the total loss).

More generally, a method for incremental learning object detection in images without catastrophic forgetting of previously-learned object classes performs training of a two-stage neural network object detector to locate and identify objects pertaining to an additional object class until an overall detection accuracy criterion is met. The overall detection accuracy describes the trained object detector's ability to detect previously-learned object classes and the additional object class. For example, a sum of predictions expressed as probabilities have to exceed an accuracy threshold or prediction probability for each of the objects has to exceed a low threshold accuracy limit.

The two-stage neural network object detector is iteratively updated so as to balance minimizing a loss of its initial ability to locate and identify objects pertaining to previously-learned object classes and maximizing its ability to additionally locate and to identify the objects pertaining to the additional object class. Ability may be measured by percentage of correct detections among all detections, an average of prediction probabilities, combined with a number of false positive detections or false negative detections, etc. The loss of initial ability to locate and identify objects pertaining to previously-learned object classes may be a sum (or a weighted sum) of distillation losses. Such loss is determined by comparing outputs of the initial (untrained) version of the object detector with the outputs of the trained (current) version of the object detector.

The overall detection accuracy criterion may be assessed by determining a region proposal distillation loss and an object identification distillation loss. "Distillation loss" indicates respective ability's decrease due to adding the new object class. The region proposal distillation loss is based on comparing a region proposal output by an initial version of the two-stage neural network object detector with a current region proposal output by a current version of the two-stage neural network object detector for the same input training image.

The object identification distillation loss is based on comparing a previously-learned-object prediction output by the initial version of the two-stage neural network object detector with an object prediction output by the current version of the two-stage neural network object detector. The comparisons for determining distillation losses are performed from the previously-learned object classes perspective. The two-stage neural network object detector is updated such as to minimize the region proposal distillation loss and the object identification distillation loss.

Figure 3:
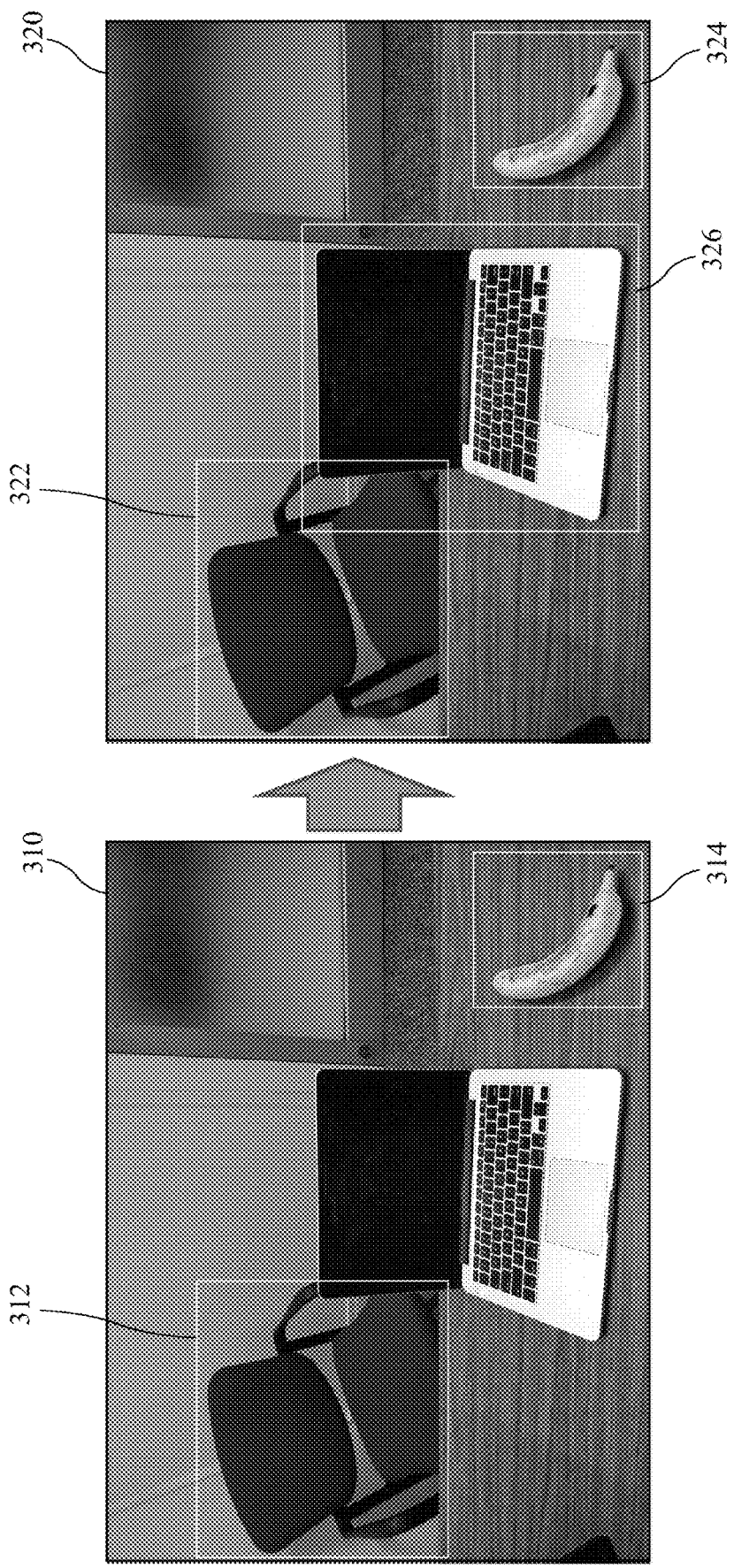
FIG. 3 illustrates outputs of an initial version of an object detector and a trained version of the object detector using the same image as input.

FIG. 3 exemplarily illustrates object detection (i.e., location in a box and object identification) of two objects (a chair and a banana) in left-side image 310 by an initial version of the object detector trained for 19 object classes, and object detection of the two objects and an additional object (i.e., the laptop) in right-side image 320 by a version of the two-stage neural network object detector trained for 20 object classes (i.e., also for detecting the laptop). The region proposal consists of rectangular boxes 312, 314 and 322-326, respectively. The object prediction may be expressed as a specific object probability. the "chair" 0.98 and "banana" 0.95 as the old classes, and "laptop" 0.99 as the new class (after: chair 0.96, banana 0.95), and update the text accordingly.

For left-side image, probability for the chair in box 312 is 0.98 (1 being certain) and probability for the banana in box 314 is 0.99. For right-side image, probability for the chair in box 322 is 0.96, probability for the banana in box 324 is 0.95, and probability for the laptop in box 328 is 0.99.

Figure 4:
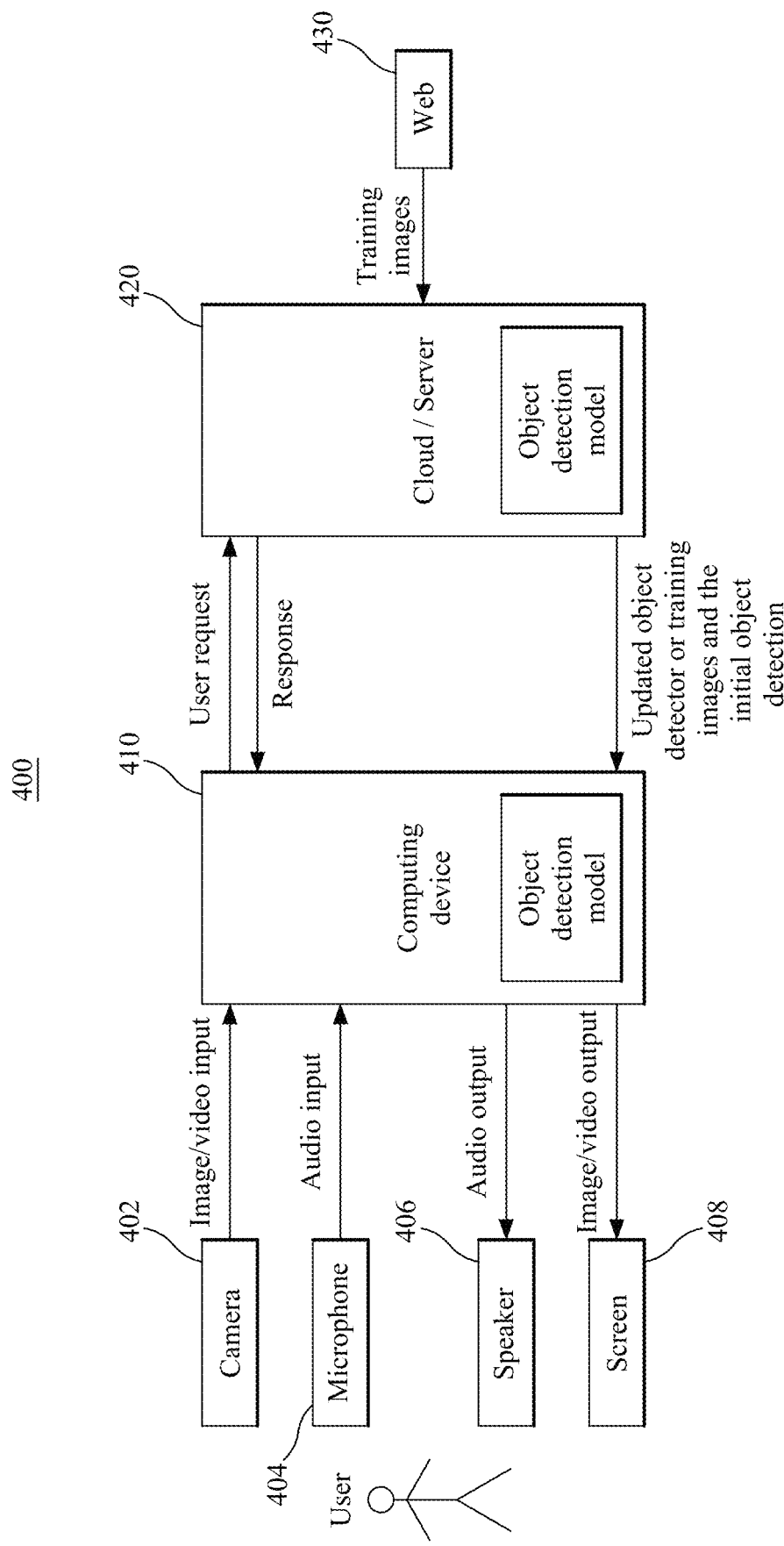
FIG. 4 illustrates an object detection system according to an embodiment.

FIG. 4 illustrates an object detection system 400 according to an embodiment. The object detection system includes a computing device 410 and a cloud device 420 (e.g., a server). The computing device is able to receive image/video input from a camera 402, and to transmit image/video output to a screen 408. The computing device is also able to receive audio input from a microphone 404, and to transmit audio output to a speaker 406.

Camera 402, which provides the image/video input to the computing device, may be integrated in a smart phone or smart glasses, or may be a stand-alone camera. Microphone 404 enables user requests articulated by the user to be provided as audio input to the computer device.

Computing device 410 is configured to handle audio and video input and output, to conduct object detection, and to communicate with cloud/server 420. Cloud/server 420 is configured to conduct object detection, to process user's request received from the computing device, to gather training images from the web 430, and to store the initial version of the object detector.

At least one of computing device 410 and cloud/server 420 is configured to perform a method for incremental learning object detection in images without catastrophic forgetting of previously-learned object classes (e.g., as previously described). When incremental learning is performed by the cloud/server, the object detector trained to detect objects pertaining to an additional object class is sent to the computing device. When the method is performed by the computing device, the cloud/server provides the training images and the initial version of the object detector to the computing device.

It is to be understood that although a detailed description on cloud computing is provided, implementation of the teachings provided herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources, e.g., networks, network bandwidth, servers, processing, memory, storage, applications, virtual machines, and services, that can be rapidly provisioned and released with minimal management effort or interaction with a provider of the service.

This cloud model may include at least five characteristics, at least three service models, and at least four deployment models. The five characteristics are on-demand self-service, broad network access, resource pooling, rapid elasticity and measured service. Regarding on-demand self-service, a cloud consumer can unilaterally provision computing capabilities, such as server time and network storage, as needed automatically without requiring human interaction with the service's provider. Broad network access refers to capabilities that are available over a network and accessed through standard mechanisms that promote use by heterogeneous thin or thick client platforms, e.g., mobile phones, laptops, and PDAs. For resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction, e.g., country, state, or datacenter. Rapid elasticity refers to capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. For measured service, cloud systems automatically control and optimize resource use by leveraging a metering capability at some level of abstraction appropriate to the type of service, e.g., storage, processing, bandwidth, and active user accounts. Resource usage can be monitored, controlled, and reported, providing transparency for both the provider and consumer of the utilized service.

The three service models are Software as a Service (SaaS), Platform as a Service (PaaS) and Infrastructure as a Service (IaaS). Software as a service provides the capability to the consumer to use the provider's applications running on a cloud infrastructure. The applications are accessible from various client devices through a thin client interface such as a web browser, e.g., web-based e-mail. The consumer does not manage or control the underlying cloud infrastructure including network, servers, operating systems, storage, or even individual application capabilities, apart from limited user-specific application configuration settings. Platform as a service provides the capability to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service provides the capability to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components, e.g., host firewalls.

The Deployment Models are private cloud, community cloud, public cloud and hybrid cloud. The private cloud infrastructure is operated solely for an organization. It may be managed by the organization or a third party and may exist on-premises or off-premises. The community cloud infrastructure is shared by several organizations and supports a specific community that has shared concerns, e.g., mission, security requirements, policy, and compliance considerations. It may be managed by the organizations or a third party and may exist on-premises or off-premises. The public cloud infrastructure is made available to the general public or a large industry group and is owned by an organization selling cloud services. The hybrid cloud infrastructure is a composition of two or more clouds (private, community, or public) that remain unique entities but are bound together by standardized or proprietary technology that enables data and application portability, e.g., cloud bursting for load-balancing between clouds.

Figure 5:
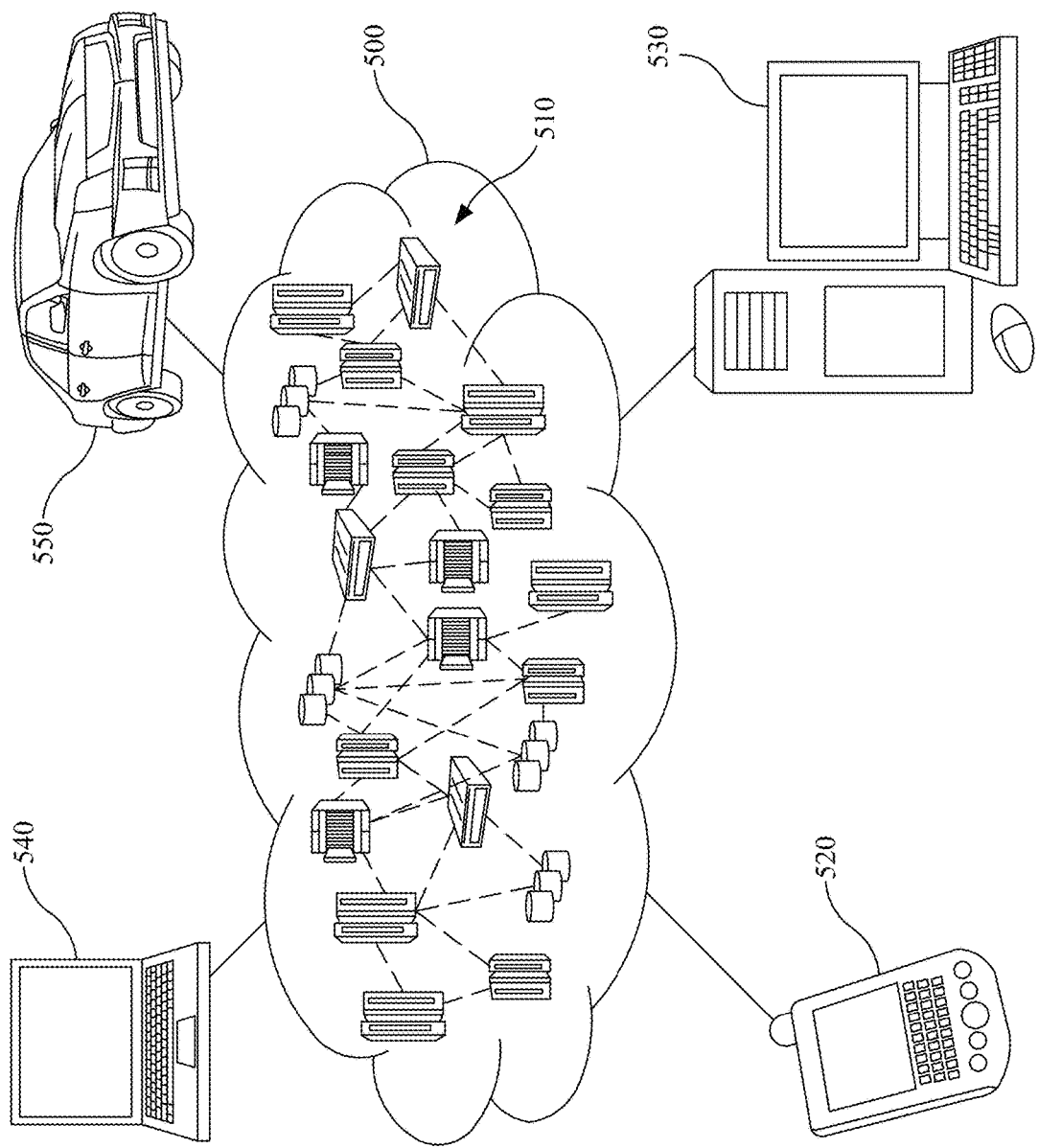
FIG. 5 depicts a cloud computing environment according to an embodiment of the present invention.

A cloud computing environment is service oriented with a focus on statelessness, low coupling, modularity, and semantic interoperability. At the heart of cloud computing is an infrastructure that includes a network of interconnected nodes. Referring now to FIG. 5, an illustrative cloud computing environment 500 is depicted. As shown, the cloud computing environment 500 includes one or more cloud computing nodes 510 with which local computing devices used by cloud consumers, such as, for example, personal digital assistant (PDA) or cellular telephone 520, desktop computer 530, laptop computer 540, and/or automobile computer system 550 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-550 shown in FIG. 5 are intended to be illustrative only and that computing nodes 510 and cloud computing environment 500 can communicate with any type of computerized device over any type of network and/or network addressable connection, e.g., using a web browser.

Figure 6:
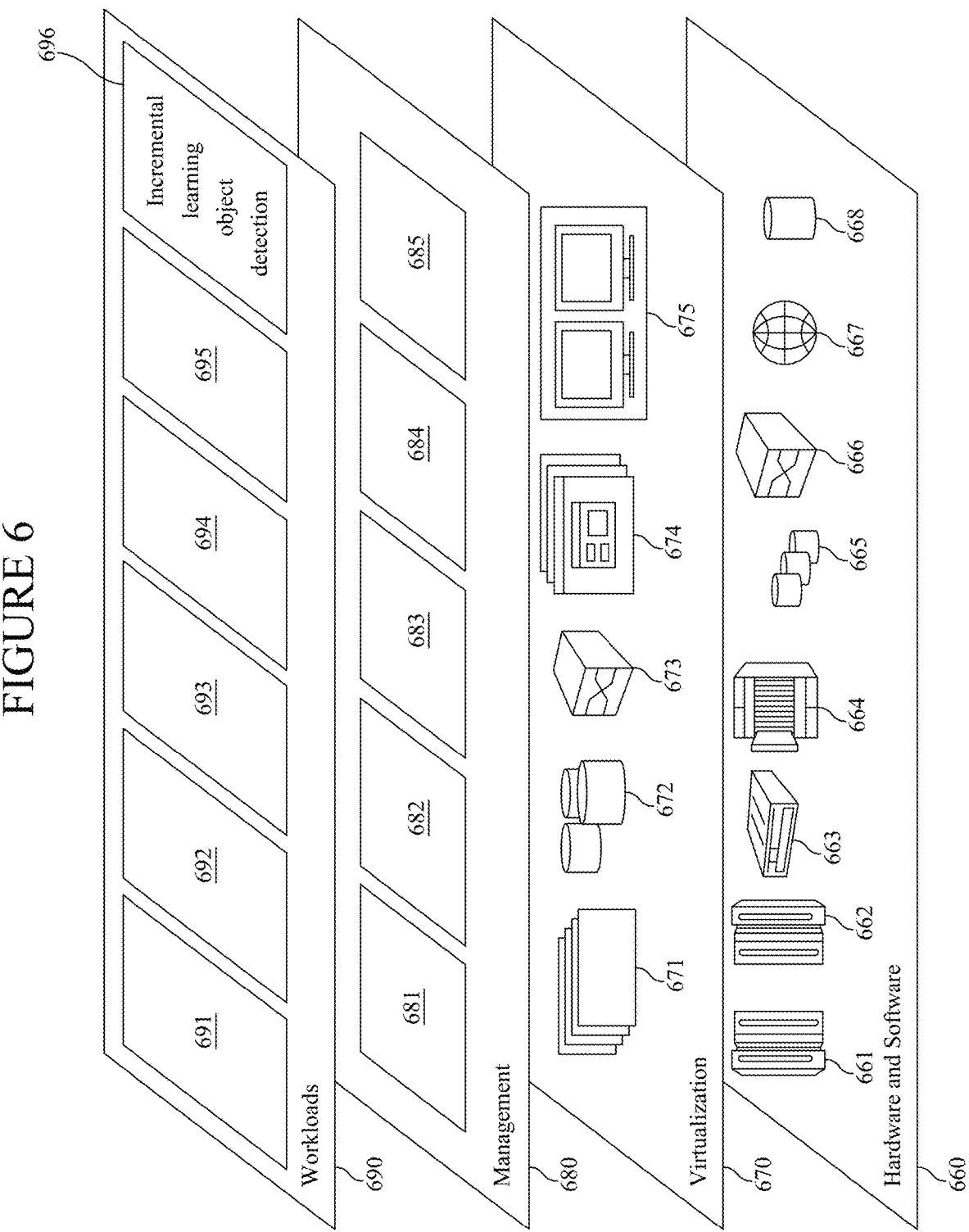
FIG. 6 depicts abstraction model layers according to an embodiment of the present invention.

Referring now to FIG. 6, a set of functional abstraction layers provided by cloud computing environment 500 is shown. It should be understood in advance that the components, layers, and functions shown in FIGS. 1, 2 and 4 are intended to be illustrative only and embodiments of the invention are not limited thereto. As depicted, the following layers and corresponding functions are provided. Hardware and software layer 660 is made of hardware and software components. Examples of hardware components include: mainframes 661, RISC (Reduced Instruction Set Computer) architecture-based servers 662, servers 663, blade servers 664, storage devices 665, and networks and networking components 666. In some embodiments, software components include network application server software 667 and database software 668.

A virtualization layer 670 is an abstraction layer which includes one or more of virtual entities such as: virtual servers 671, virtual storage 672, virtual networks 673 (which may be virtual private networks), virtual applications and operating systems 674, and virtual clients 675.

In one example, management layer 680 may provide the next described functions. Resource provisioning 681 provides dynamic procurement of computing resources and other resources that are utilized to perform tasks within the cloud computing environment. Metering and pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691, software development and lifecycle management 692, virtual classroom education delivery 693, data analytics processing 694, transaction processing 695, and incremental learning object detection 696.

Figure 7:
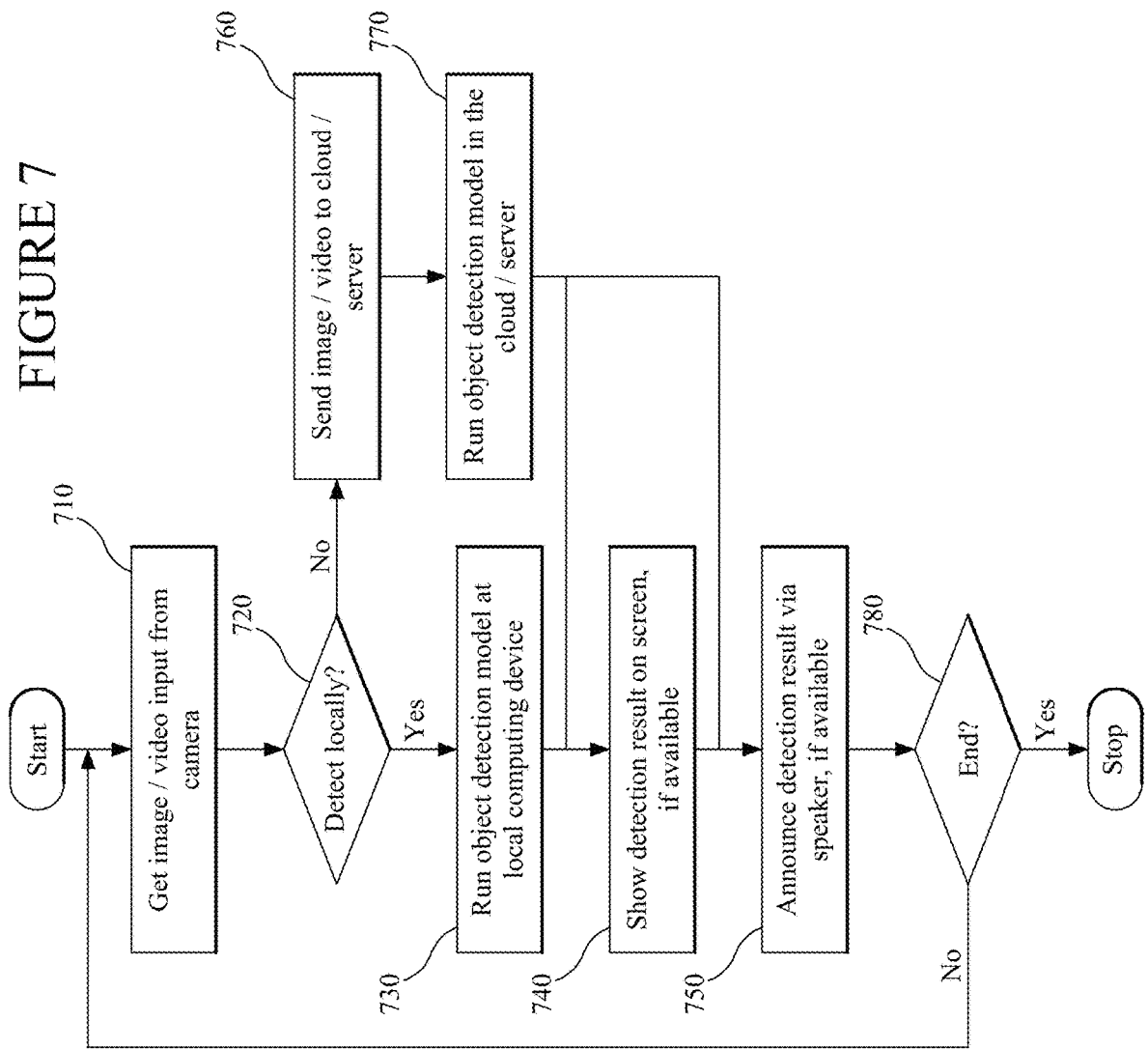
FIG. 7 is a flowchart illustrating object detection according to an embodiment.

FIGS. 7-10 are flowcharts of methods that may be executed by the system 400 illustrated in FIG. 4. These flowcharts show steps performed by computing device 410 or cloud/server 420. The object detector may be run by computing device 410 or by cloud/server 420. FIG. 7 is a flowchart illustrating object detection encompassing local or cloud object detection. At 710, the computing device receives image(s) from a camera (e.g., 402). If object detection is performed locally (i.e., "Yes" branch of block 720), then the object detector is run on the local computing device at 730. If object detection is performed in the cloud (i.e., "No" branch of block 720), then the computing device sends the received image(s) to the cloud/server at 760 thereby enabling the object detector to run on the cloud/server at 770. The detection results are then output to the user: shown (e.g., on screen 408) at 740 and/or announced (e.g., using speaker 406) at 750. If object detection continues (i.e., "No" branch of block 780) then the computing device is ready to process other image(s) at 710. The detection may continue, for example, when a video stream is received as batches of images.

Figure 8:
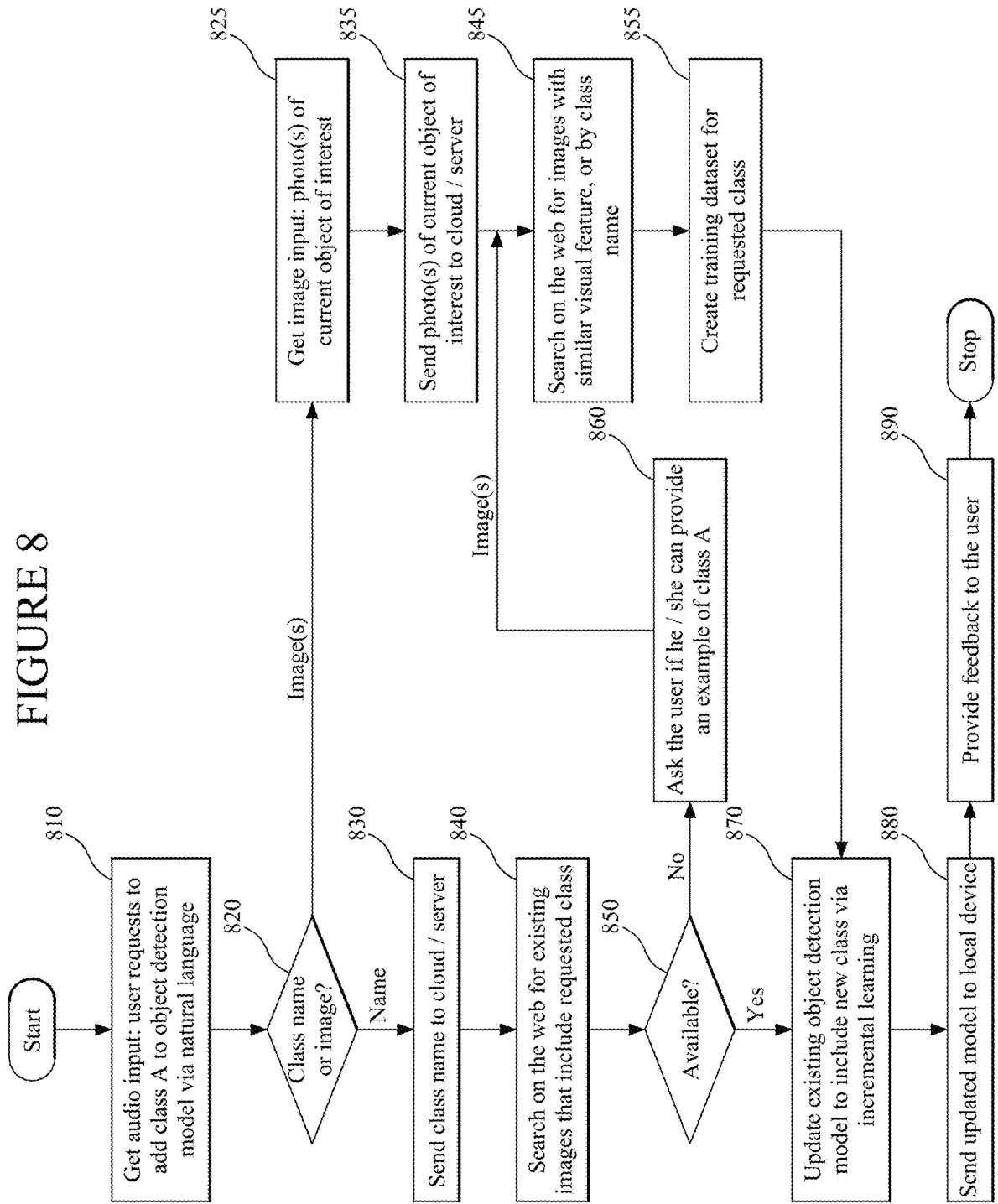
FIG. 8 is a flowchart of a method for adding a new class according to an embodiment.

FIG. 8 is a flowchart of a method for adding a new class of objects, designated as class A, to an existing object detector, such as the detector used in FIG. 7. This method illustrates obtaining training datasets that can be used for incremental training and is based on what is provided in the input (image or name), the ability to obtain existing training datasets or the need to create a new training dataset.

At 810, the computing device receives a user request for adding class A as audio input to the object detector's previously-learned object classes. At 820, the computing device extracts class A's name from the user request received as natural language from the microphone or obtains a representative image for object class A provided by the camera. In the former case, the computing device sends class A's name to the cloud/server at 830. Otherwise, the computing device sends the representative image to the cloud/server.

Upon receiving class A's name, the cloud/server searches on the web for existing images that include the requested class A at 840. If determined that such images are not available at 850, The user is asked to provide a sample image of a class A object at 860. If such images are available, they are gathered to form a set of training images for updating the object detector to be able to detect objects pertaining to class A via incremental learning at 870. The updated object detector is provided to the computing device at 880, which may then provide audio or video feedback relative to class A detection ability to the user at 890.

Returning now to 820, if the computing device obtains a representative image for object class A, the computing device prepares photo(s) of class A object(s) at 825 and sends it/them to the cloud/server at 835. Upon receiving the photo(s) or sample image(s) from the user, the cloud/server searches the web for images using visual features similar with the received photo(s) or sample images or the class name at 845. The cloud/server creates a set of training images for class A at 855, the training images being used for updating the object detector at 870.

Figure 9:
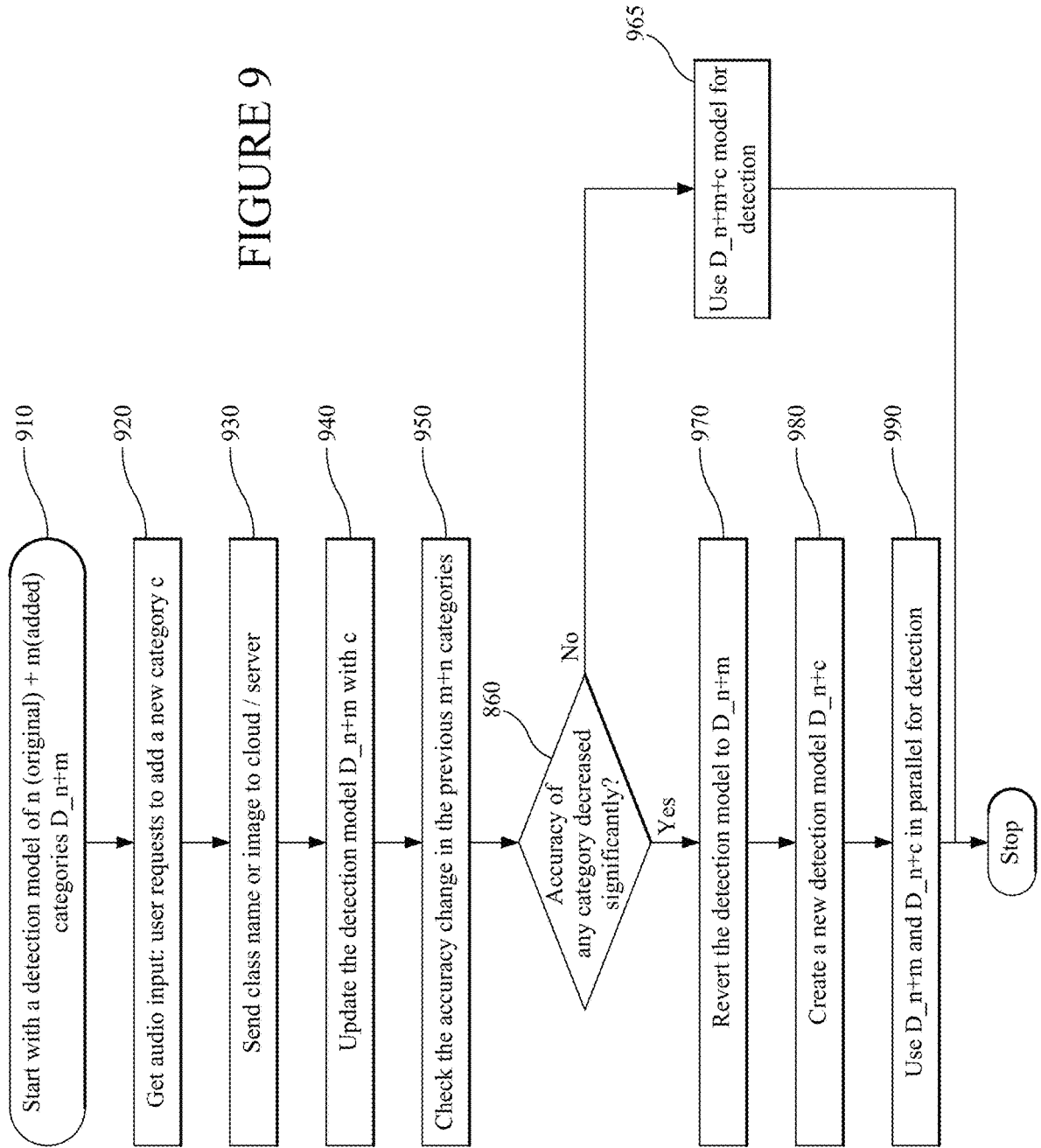
FIG. 9 is a flowchart illustrating accuracy-aware model improvement according to an embodiment.

FIG. 9 is a flowchart illustrating accuracy-aware model training. This method illustrates options that may be provided for the case in which adding the new class in not smooth. Starting with a detection model D_n+m able to detect objects pertaining to an original set of n object classes and to an added set of m classes at 910, the computer device receives a user request to add a new category c at 920. The computer device sends class c's name of a representative image thereof to the cloud/server at 930. The cloud/server updates the detection model to add object class c to the m+n object classes that the object detector was already able to detect at 940. The computer device then checks the detection accuracy decrease for the m+n object classes (also named categories) due to training (i.e., a difference between a detection accuracy of D_n+m and a detection accuracy D_m+n+c) at 950. If detection accuracy for any category decreased significantly (branch "Yes" of block 960) then the system reverts to D_n+m model at 970, creates a new detection model D_n+c at 980 and uses in parallel D_n+m and Dn+c at 990. Otherwise (branch "No" of block 960) the computing device uses D_n+m+c model for object detection at 965.

FIG. 10 is a flowchart illustrating adding new object to an object detection model upon receiving a user request. At 1010, the computing device receives audio input including a user request to add a new object to an existing object detection model. At 1020, the computing device receives images of the new object (e.g., photos of such a new object viewed from different angles). The computing device sends the images (photos) to the cloud/server at 1030. The server updates the existing detection model to include the new object class at 1040 and send the updated model to the computing device at 1050.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for incremental learning object detection in images without catastrophic forgetting of previously-learned object classes. The machine-readable or computer-readable code can be any type of code or language capable of being read and executed by the machine or computer and can be expressed in any suitable language or syntax known and available in the art including machine languages, assembler languages, higher level languages, object-oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for incremental learning object detection in images without catastrophic forgetting of previously-learned one or more object classes, the method comprising:
   training a two-stage neural network object detector to locate and identify objects pertaining to an additional object class in images by iteratively updating the two-stage neural network object detector until an overall detection accuracy criterion is met,
   wherein
   the updating is performed so as to balance minimizing a loss of an initial ability to locate and identify objects pertaining to the previously-learned one or more object classes and maximizing an ability to additionally locate and identify the objects pertaining to the additional object class, and
   assessing whether the overall detection accuracy criterion is met includes:
      determining a region proposal distillation loss based on comparing a region proposal output by an initial version of the two-stage neural network object detector with a current region proposal output by a current version of the two-stage neural network object detector, wherein the region proposal distillation loss quantifies a decrease of ability to locate objects pertaining to a previously-learned object classes; and
      determining a previously learned object identification distillation loss based on comparing a previously learned object prediction obtained by the initial version of the two-stage neural network object detector with an object prediction output by the current version of the two-stage neural network object detector.

2. The method of claim 1, wherein
   the two-stage neural network object detector is updated such as to minimize the region proposal distillation loss and the previously learned object identification distillation loss.

3. The method of claim 2, wherein
   the two-stage neural network object detector is updated by applying an optimization method to a total loss, which is a combination of
   the region proposal distillation loss,
   the previously learned object identification distillation loss,
   a region proposal network loss of the current version of the two-stage neural network object detector, and
   an object identification loss of the current version of the two-stage neural network object detector, and
   the region proposal network loss and the object identification loss quantify the ability to locate and identify the objects pertaining to the additional object class, respectively.

4. The method of claim 3, wherein,
   if the total loss exceeds a first predetermined threshold or an ability to detect objects pertaining to one object class among the one or more object classes decreases below a second predetermined threshold, then another optimization method is applied, or the training is abandoned.

5. The method of claim 3, wherein
   the optimization method is a stochastic gradient descent method applied to the total loss.

6. The method of claim 1, wherein
   the training uses training images, and the overall detection accuracy criterion is evaluated using validation images distinct from the training images.

7. The method of claim 1, further comprising:
   additional training the two-stage neural network object detector to locate and identify objects pertaining to another additional object class by iteratively additionally updating the two-stage neural network object detector until another overall detection accuracy criterion is met,
   wherein the additionally updating is performed so as to minimize a loss of an ability to locate and identify the objects pertaining to the one or more previously-learned object classes and to the additional class while maximizing an additional ability to locate and identify the objects pertaining to the other additional object class.

8. The method of claim 1, wherein
   the two-stage neural network object detector is simultaneously trained to locate and identify the objects pertaining to the additional object class and objects pertaining to another additional object class.

9. The method of claim 1, further comprising at least one of:
   receiving a user request for training the two-stage neural network object detector to locate and identify the objects pertaining to the additional object class, and
   retrieving training images including an object pertaining to the additional object class from Internet.

10. A method for incremental learning object detection without catastrophic forgetting of previously-learned object classes, the method comprising:
    receiving training images including objects pertaining to an object class unknown to an initial version of a two-stage neural network object detector that is able to detect objects pertaining to at least one previously-learned object class; and
    training the two-stage neural network object detector to detect the objects of the object class initially unknown, using one-by-one plural images among the training images, until a predetermined condition is met by:
       inputting one image of the plural images to the initial version of the two-stage neural network object detector to obtain a first region proposal and a first object prediction for the at least one previously-learned object class,
       inputting the one image to a current version of the two-stage neural network object detector to obtain a second region proposal and a second object prediction for the at least one previously-learned object class and the object class initially unknown, comparing the first region proposal with the second region proposal to estimate a region proposal distillation loss quantifying a decrease of ability to locate objects of the at least one previously-learned object class, comparing the first object prediction with the second object prediction to estimate an object identification distillation loss quantifying decrease of ability to identify the objects of the at least one previously-learned object class, comparing the second region proposal with ground-truth labels of the one image to estimate a region proposal network loss for the object class initially unknown, comparing the second object prediction with the ground-truth labels to estimate an object identification loss for the object class initially unknown, calculating a total loss combining the region proposal distillation loss, the object identification distillation loss, the region proposal network loss and the object identification loss, and updating the current version of the two-stage neural network object detector so as to minimize the total loss, wherein the predetermined condition is met when the number of training iterations reaches a predetermined number, or when a total loss decrease rate is below a predetermined threshold.

11. A computer-readable medium containing a computer-readable code that when read by a computer causes the computer to perform a method for incremental learning for object detection in images without catastrophic forgetting of previously-learned one or more object classes, the computer-readable medium comprises:

one or more non-transitory computer-readable medium and method stored on the one or more non-transitory computer-readable medium, the method comprising:

training a two-stage neural network object detector to locate and identify objects pertaining to an additional object class in images by iteratively updating the two-stage neural network object detector until an overall detection accuracy criterion is met, wherein the updating is performed so as to balance minimizing a loss of an initial ability to locate and identify objects pertaining to the previously-learned one or more object classes and maximizing an ability to additionally locate and identify the objects pertaining to the additional object class, and assessing whether the overall detection accuracy criterion is met includes:

determining a region proposal distillation loss based on comparing a region proposal output by an initial version of the two-stage neural network object detector with a current region proposal output by a current version of the two-stage neural network object detector, wherein the region proposal distillation loss quantifies a decrease of ability to locate objects pertaining to a previously-learned object classes; and determining a previously learned object identification distillation loss based on comparing a previously learned object prediction obtained by the initial version of the two-stage neural network object detector with an object prediction output by the current version of the two-stage neural network object detector.

12. The computer-readable medium of claim 11, wherein the two-stage neural network object detector is updated such as to minimize the region proposal distillation loss and the previously learned object identification distillation loss.

13. The computer-readable medium of claim 12, wherein the two-stage neural network object detector is updated by applying an optimization method to a total loss, which is a combination of the region proposal distillation loss, the previously learned object identification distillation loss, a region proposal network loss of the current version of the two-stage neural network object detector, and an object identification loss of the current version of the two-stage neural network object detector, and the region proposal network loss and the region convolution neural network loss quantify the ability to locate and identify the objects pertaining to the additional object class, respectively.

14. The computer-readable medium of claim 12, wherein if the total loss exceeds a first predetermined threshold or an ability to detect objects pertaining to one object class among the one or more object classes decreases below a second predetermined threshold, then another optimization method is applied, or the training is abandoned.

15. The computer-readable medium of claim 12, wherein the optimization method is a stochastic gradient descent method applied to the total loss.

16. The computer-readable medium of claim 11, wherein the training uses training images, and the overall detection accuracy criterion is evaluated using validation images distinct from the training images.

17. The computer-readable medium of claim 11, wherein the method further comprises:

additional training the two-stage neural network object detector to locate and identify objects pertaining to another additional object class by iteratively additionally updating the two-stage neural network object detector until another overall detection accuracy criterion is met, wherein the additionally updating is performed so as to minimize a loss of an ability to locate and identify the objects pertaining to the one or more previously-learned object classes and to the additional class while maximizing an additional ability to locate and identify the objects pertaining to the other additional object class.

18. The computer-readable medium of claim 11, wherein the two-stage neural network object detector is simultaneously trained to locate and identify to locate and identify the objects pertaining to the additional object class and objects pertaining to another additional object class.

19. The computer-readable medium of claim 11, wherein the method further comprises at least one of:

receiving a user request for training the two-stage neural network object detector to locate and identify the objects pertaining to the additional object class, and retrieving training images including an object pertaining to the additional object class from Internet.

20. A computer-readable medium containing a computer-readable code that when read by a computer causes the computer to perform a method for incremental learning for object detection in images without catastrophic forgetting of previously-learned object classes, the computer-readable comprising:
  one or more non-transitory computer-readable medium and method stored on the one or more non-transitory computer-readable medium, the method comprising:
  training the two-stage neural network object detector to detect the objects of the object class initially unknown, using one-by-one plural images among the training images, until a predetermined condition is met by:
  inputting one image of the plural images to the initial version of the two-stage neural network object detector to obtain a first region proposal and a first object prediction for the at least one previously-learned object class,
  inputting the one image to a current version of the two-stage neural network object detector to obtain a second region proposal and a second object prediction for the at least one previously-learned object class and the object class initially unknown,
  comparing the first region proposal with the second region proposal to estimate a region proposal distillation loss quantifying a decrease of ability to locate objects of the at least one previously-learned object class,
  comparing the first object prediction with the second object prediction to estimate an object identification distillation loss quantifying decrease of ability to identify the objects of the at least one previously-learned object class,
  comparing the second region proposal with ground-truth labels of the one image to estimate a region proposal network loss for the object class initially unknown,
  comparing the second object prediction with the ground-truth labels to estimate an object identification loss for the object class initially unknown,
  calculating a total loss combining the region proposal distillation loss, the object identification distillation loss, the region proposal network loss and the object identification loss, and
  updating the current version of the two-stage neural network object detector so as to minimize the total loss,
  wherein the predetermined condition is met when the number of training iterations reaches a predetermined number, or when a total loss decrease rate is below a predetermined threshold.

21. A system for incremental learning for object detection without catastrophic forgetting of previously-learned object classes, the system comprising:
  a computing device having a user interface and configured to use a two-stage neural network object detector to locate and identify objects and to communicate with a cloud server; and
  the cloud server configured to gather training images, to store an initial version of the two-stage neural network object detector that locates and identifies previously-learned object classes, and to communicate with the computing device and Internet,
  wherein
  at least one of the computing device and the cloud server is configured to train the two-stage neural network object detector to locate and identify objects pertaining to an additional object class by iteratively updating the two-stage neural network object detector that is able to locate and identify objects pertaining to previously-learned object classes until an overall detection accuracy criterion is met,
  the updating is performed so as to balance minimizing a loss of an initial ability of the two-stage neural network detector to locate and identify objects pertaining to the one or more object classes and maximizing an ability of the two-stage neural network detector to additionally locate and identify objects pertaining to the additional object class, and
  assessing whether the overall detection accuracy criterion is met includes:
  determining a region proposal distillation loss based on comparing a region proposal output by an initial version of the two-stage neural network object detector with a current region proposal output by a current version of the two-stage neural network object detector, wherein the region proposal distillation loss quantifies a decrease of ability to locate objects pertaining to a previously-learned object classes; and
  determining a previously learned object identification distillation loss based on comparing a previously learned object prediction obtained by the initial version of the two-stage neural network object detector with an object prediction output by the current version of the two-stage neural network object detector.

22. The system of claim 21, wherein
the two-stage neural network object detector is updated by applying an optimization method to a total loss, which is a combination of
  the region proposal distillation loss,
  the previously learned object identification distillation loss,
  a region proposal network loss of the current version of the two-stage neural network object detector, and
  an object identification loss of the current version of the two-stage neural network object detector, and
  the region proposal network loss and the object identification loss quantify the ability to locate and identify the objects pertaining to the additional object class, respectively.

23. The system of claim 22, wherein,
if the total loss exceeds a first predetermined threshold or an ability to detect objects pertaining to one object class among the one or more object classes decreases below a second predetermined threshold, then another optimization method is applied, or the training is abandoned.

24. The system of claim 21, wherein
the two-stage neural network object detector is trained to locate and identify objects pertaining to another additional object class simultaneously or sequentially with training the two-stage neural network object detector to locate and identify the objects pertaining to the additional object class.

* * * * *